No. 656,065. Patented Aug. 14, 1900.
O. P. VROOM & C. H. ARBUCKLE.
HAY STACKER.
(Application filed Jan. 25, 1900.)
(No Model.) 3 Sheets—Sheet 3.

Witnesses
Howard D. Orr,
J. W. Garner

Inventors
O. P. Vroom
and C. H. Arbuckle,
By their Attorneys,
C. A. Snow & Co.

UNITED STATES PATENT OFFICE.

OLER P. VROOM AND CHARLES H. ARBUCKLE, OF WINIGAN, MISSOURI, ASSIGNORS OF ONE-HALF TO AUGUSTUS G. SORGE AND JAMES H. SORGE, OF SAME PLACE.

HAY-STACKER.

SPECIFICATION forming part of Letters Patent No. 656,065, dated August 14, 1900.

Application filed January 25, 1900. Serial No. 2,769. (No model.)

*To all whom it may concern:*

Be it known that we, OLER P. VROOM and CHARLES H. ARBUCKLE, citizens of the United States, residing at Winigan, in the county of Sullivan and State of Missouri, have invented a new and useful Hay-Stacker, of which the following is a specification.

Our invention is an improved hay stacking and ricking apparatus adapted to receive hay from a rake in the field and capable of being operated to elevate the hay and deposit the same on a stack or rick.

One object of our invention is to provide a novel combination of devices by which additional leverage is obtained to effect the initial elevation of the loaded fork-frame.

A further object of our invention is to provide a novel combination of devices to carry the fork-frame rearwardly over the center of gravity after the hay elevated thereby has been discharged therefrom onto the stack or rick.

A further object of our invention is to provide a novel combination of a guy-frame with a tilting hoisting-frame, whereby the latter will be engaged and stopped by the guy-frame as the tilting frame moves rearward with the unloaded fork-frame to prevent the latter from descending too rapidly.

With these and other objects in view our invention consists in the combination, with a pivoted fork-frame, of a tilting frame, a rocking frame mounted on the tilting frame and connected to the fork-frame, a rope or cord for tilting and drawing the rocking and tilting frames, and a guy-frame and connections between said guy-frame and fork-frame to guy the latter and limit the movement thereof when elevating hay.

Our invention further consists in the peculiar construction and combination of devices hereinafter fully set forth, and particularly pointed out in the claims.

Figure 1:
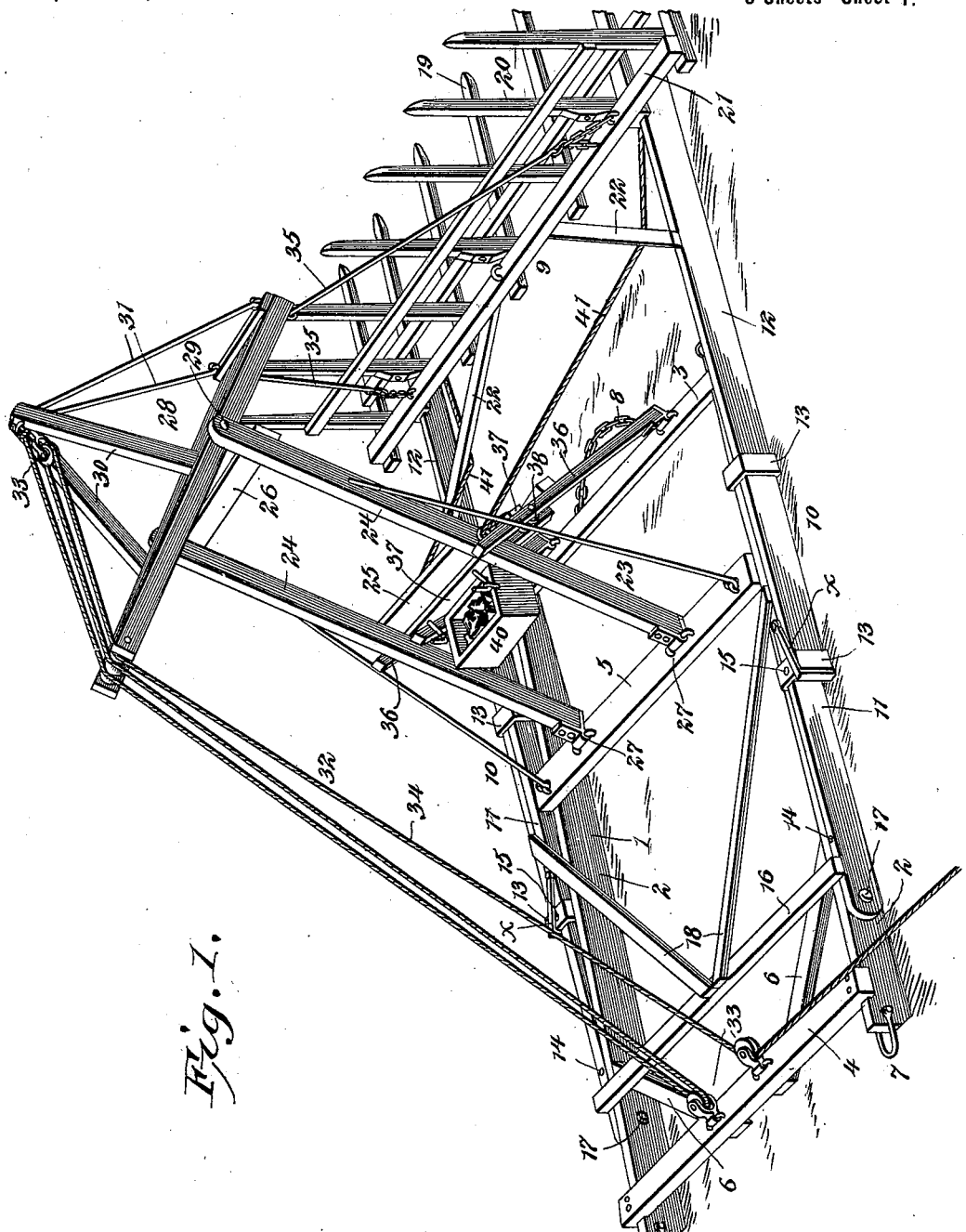
Figure 2:
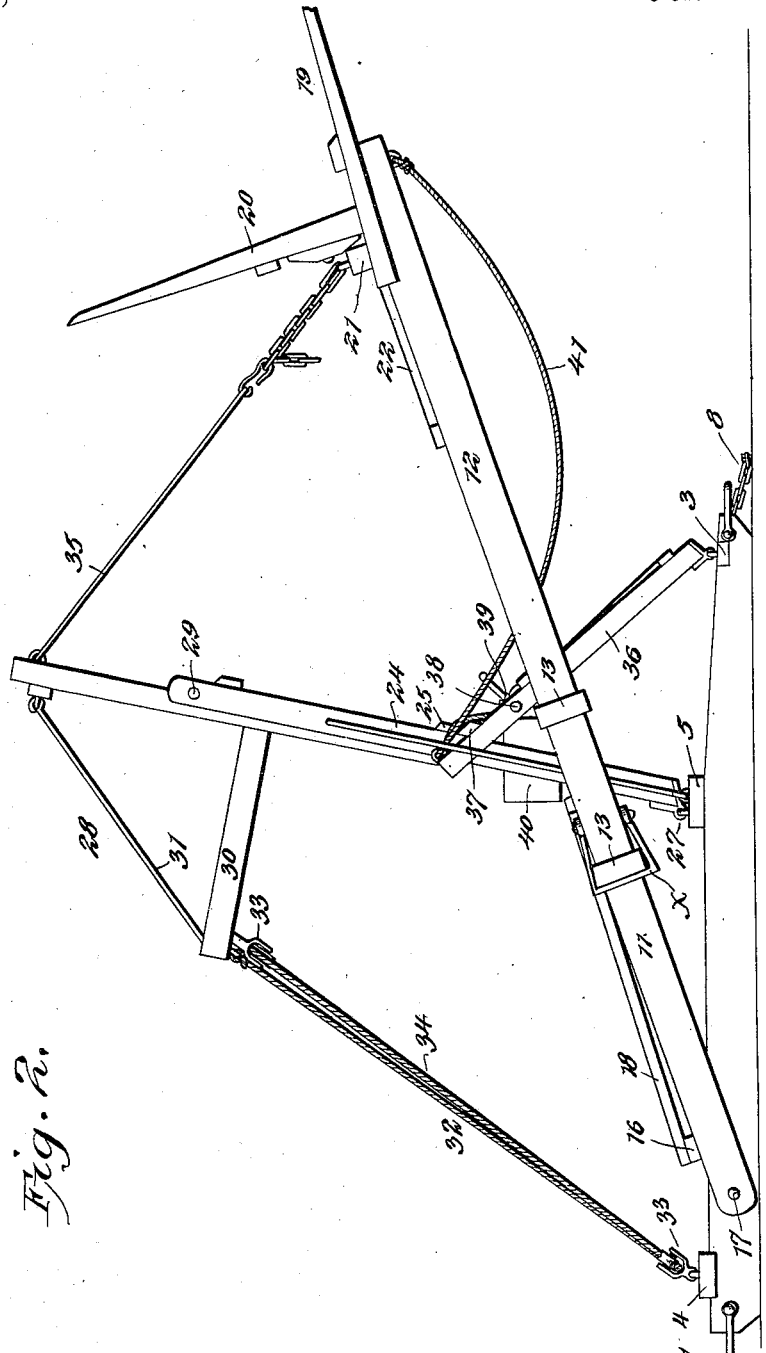
Figure 3:
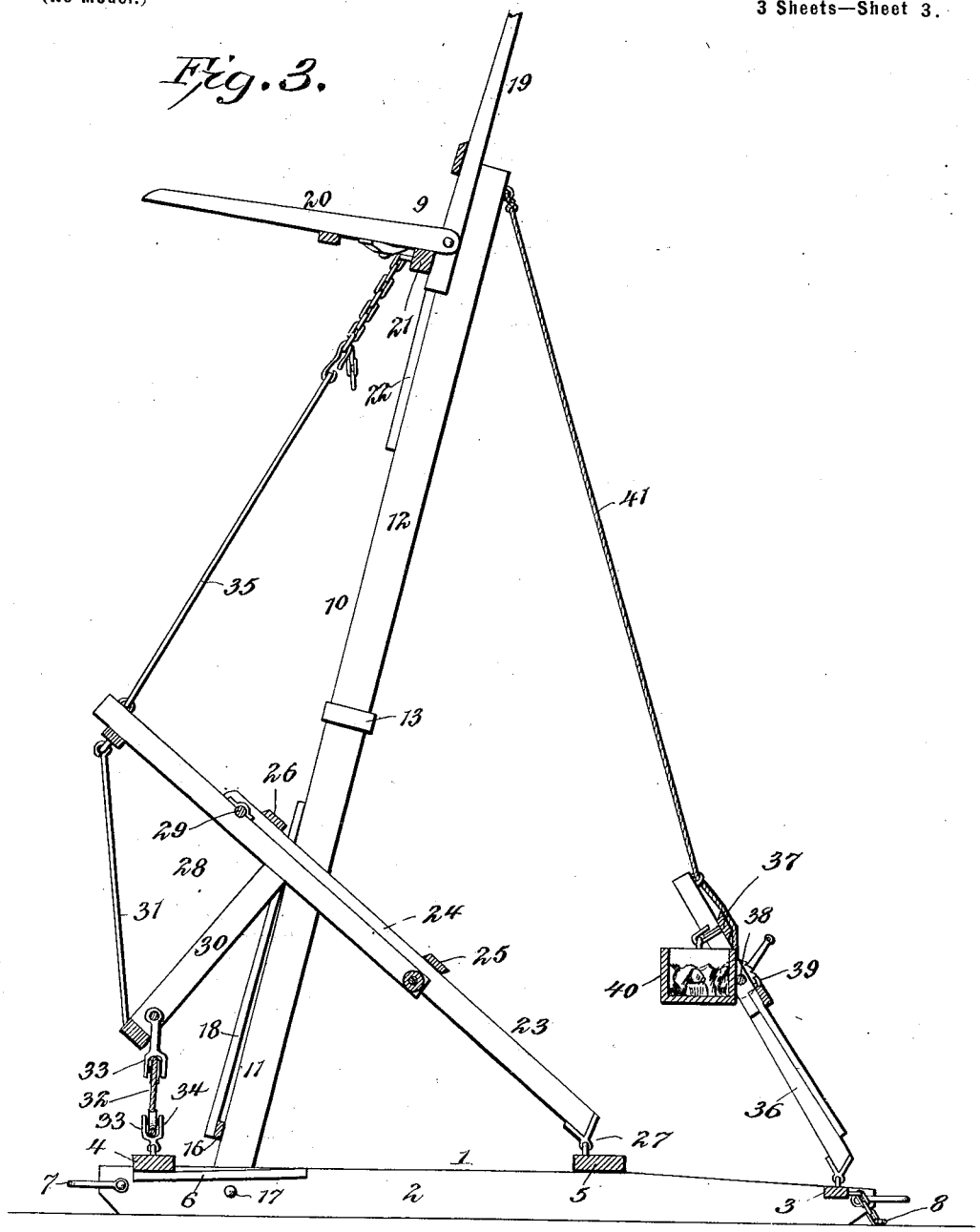

In the accompanying drawings, Figure 1 is a perspective view of a hay stacker and ricker embodying our improvements, showing the same in its initial position with the fork-frame level and extended on the ground. Fig. 2 is a side elevation of the same, showing the initial position of the tilting or derrick frame and the rocking frame thereon and showing the guy-frame in engagement with the tilting frame. Fig. 3 is a similar view of our invention, showing the fork-frame raised to nearly the limit of its movement.

The drag-frame 1, which constitutes the support for our improved hay stacking and ricking apparatus, comprises the side bars or runners 2, the cross-bars 3 4, connecting the opposite ends thereof, the cross-bar 5, intermediate said bars 3 4 and somewhat nearer the former than the latter, and the diagonally-disposed brace-bars 6, which connect the bar 4 with the side bars or runners 2 at the front corners of the drag-frame. The latter is further provided at the ends of its side bars or runners with links 7, which serve for the engagement with suitable pins or stakes driven in the ground at the point where the stack or rick is to be constructed, so as to prevent the stacking and ricking apparatus from moving when in operation. A drag-chain 8 is attached to the cross-bar 3 and is adapted for the attachment of a singletree or doubletree, whereby a horse or team may be employed to drag the stacking and ricking apparatus from one point to another.

The fork-frame 9 comprises the sides 10, each of which is composed of a pair of bars 11 12, of suitable length, which overlap each other and are connected together by bands 13, which are adapted to slide with said bars 11 and 12, and thereby the sides of the fork-frame are rendered extensible in length, as will be readily understood. Adjusting-openings 14 are made in the bars 11, and an opening 15 is made in each of the bands 13, which are rigidly attached to the inner end of the bars 12 and are adapted to slide on the bars 11, said openings 15 registering with the openings 14 when the fork-frame is lengthened or shortened, and hence by inserting suitable lock-pins in said registering openings the fork-frame may be adjusted to and retained at any desired length. A cross-bar 16 connects the bars 11 near the pivotal points 17, where they are attached to the side bars or runners of the drag-frame, and suitable brace-bars 18 connect said cross-bar 16 with the bars 11, as shown in Fig. 1, to secure the required rigidity to the fork-frame. A suitable fork 19 is secured on the outer end of the fork-frame, and a fork-head 20 is at the inner end of said fork 19, the tines or fork-bars of the latter being longer than those of the former, and said fork-head 20 being disposed at substantially right angles with relation to the fork 19. A cross-bar 21 on the inner end of the tines or fork-bars of the head 19 is connected to the bars 12 of the extensible fork-frame by obliquely-disposed brace-bars 22.

A tilting derrick-frame 23, which comprises the side bars 24, the cross-bar 25, near the centers thereof, and the cross-bar 26, near their upper ends, is pivoted on the cross-bar 5 of the drag-frame, as at 27.

A rocking frame 28 is fulcrumed to the upper end of the tilting frame 23 at points near the center of the rocking frame, as at 29, and said rocking frame is provided with a substantially right-angled projecting member 30 at a point near its fulcrum. Brace-rods connect the outer end of said right-angled member with the corners of the outer side of the rocking frame, as at 31, and the right-angled member of the rocking frame is connected to the cross-bar 4 of the drag-frame by a suitable hoisting-tackle 32, which, as here shown, comprises three sheaves 33 and a rope 34, one end of the latter and one of the said sheaves being attached to the right-angled member of the rocking frame, two of the sheaves being attached to the cross-bar 4, and, as will be readily understood, a horse may be attached to the free end of the said rope for operating the stacking and ricking apparatus. Link rods or chains 35 connect one end of the rocking frame with the outer end of the fork-frame.

A guy-frame 36 of suitable construction is pivoted at its lower end on the cross-bar 3 and is adapted to swing toward and from the tilting frame and is provided with a cross-bar 37, which is adapted to engage the cross-bar 25, which constitutes an offset on one side of the tilting frame when the stacking apparatus is in its initial position. (Shown in Figs. 1 and 2.) A winch 38, having a suitable pawl-and-ratchet locking mechanism 39, is mounted in and carried by said guy-frame, and to the latter at its upper end is attached a weight box or receptacle 40. Guy-ropes 41 are attached to the head or outer end of the fork-frame and to the winch on the guy-frame, and by means of said winch said guy-rope may be lengthened or shortened, as will be readily understood.

The operation of our improved hay stacking and ricking apparatus is as follows: When the same is in the initial position shown in Fig. 1, the hay may be discharged from a hay-rake directly onto the fork at the outer end of the fork-frame, or it may be thrown onto the same by hand-forks from windrows, cocks, or a wagon. By drawing outward on the rope 34 the rocking frame 28, which constitutes, in effect, a bell-crank lever, is caused to move on the upper side of the tilting frame through about ninety degrees, thereby raising the loaded fork-frame from the ground to the position indicated in Fig. 2. This initial movement of the fork-frame requires a greater expenditure of power than the subsequent elevation thereof, and it was to facilitate the raising of the loaded fork-frame from the ground that we have devised the rocking frame on the upper side of the tilting frame, said rocking frame securing additional leverage and correspondingly reducing the power necessary to raise the loaded fork-frame through the first portion of its elevation. When the rocking frame has been swung to the position shown in Fig. 2, the inner ends of the arms thereof contact with the cross-bar 25 on the tilting frame, and as the power continues to be applied to the tackle the tilting frame and rocking frame (the latter in this position constituting, essentially, an extension of the former) move forward simultaneously, and hence raise the loaded fork-frame until the contents of the fork are discharged upon the proposed stack or rick. As the tilting frame swings forward and the fork-frame is elevated the slack in the guy-ropes is taken up by the elevation of the fork-frame, and hence the guy-frame becomes disengaged from the tilting frame and swung backward by the tension on the guy-ropes until the fork-frame reaches the limit of its elevation, at which point the guy-frame is substantially in the plane of the guy-ropes. By means of the winch on the guy-frame the guy-ropes may be lengthened or shortened, so as to control the movement of the fork-frame and predetermine the degree of its elevation whether forward or rearward of the center of gravity of the fork-frame. By reason of the weight-box with which the guy-frame is provided the fork-frame is started rearward to effect the initial movement of its descent as soon as the hay has been discharged therefrom and the hoisting-tackle is slackened, as will be readily understood. As the hay-fork swings backward and nears the earth the tilting frame is swung rearward thereby, and the slackening of the guy-ropes permits the guy-frame to swing forward toward the tilting frame until they come together, the weight-box being thus efficient to thus sway the guy-frame forward, and the tilting frame becomes engaged and secured against farther rearward movement by the guy-frame, the final descent of the fork-frame being permitted by the retrograde partial rotation or swing of the rocking frame on the upper part of the tilting frame, as will be readily understood.

Stirrups $x$, pivotally connected to the bars 11, as shown, are adapted to engage the lower ends of the bars 12 when the latter are extended and to support the same in such extended position, as will be understood.

Having thus described our invention, we claim—

1. The combination, with a pivoted hoisting-frame, of a tilting frame, a rocking frame mounted on the tilting frame, and connected to the hoisting-frame, tackle for tilting and drawing the rocking and tilting frames, and thereby elevating the hoisting-frame, substantially as described.

2. The combination, with a pivoted hoisting-frame, of a tilting frame, a rocking frame mounted on the tilting frame, and connected to the hoisting-frame, tackle for tilting and drawing the rocking and tilting frames, and thereby elevating the hoisting-frame, and guys for the hoisting-frame, substantially as described.

3. The combination, with a hoisting-frame, and a tilting frame connected thereto, tackle for applying power to the tilting frame and thereby elevating the hoisting-frame, the guy-frame and guys connecting said guy-frame to the hoisting-frame the latter being adapted to engage the tilting frame and arrest the retrograde movement thereof when the hoisting-frame is being lowered, substantially as described.

4. The combination of a hoisting-frame, a tilting frame, a rocking frame mounted on said tilting frame, and connected to said hoisting-frame, tackle for tilting and drawing the rocking and tilting frames and thereby elevating the hoisting-frame, a guy-frame, guys connecting said guy-frames to the said hoisting-frame, the latter being adapted to engage the tilting frame and arrest the retrograde movement thereof when the hoisting-frame is being lowered, substantially as described.

5. The combination of a hoisting-frame, a tilting frame, a rocking frame mounted on said tilting frame, and connected to said hoisting-frame, tackle for tilting and drawing the rocking and tilting frames and thereby elevating the hoisting-frame, a guy-frame, guys connecting said guy-frame to the said hoisting-frame, the latter being adapted to engage the tilting frame and arrest the retrograde movement thereof when the hoisting-frame is being lowered and means to lengthen and shorten said guys, for the purpose set forth, substantially as described.

6. The combination, with a hoisting-frame, of a tilting frame, a rocking frame mounted on the tilting frame and connected to the hoisting-frame, and a tackle to apply power to the rocking frame, the latter being adapted to engage the tilting frame after a partial rotation of the rocking frame, and thereafter form an extension of the tilting frame, and to swing in conformity with said tilting frame, substantially as described.

In testimony that we claim the foregoing as our own we have hereto affixed our signatures in the presence of two witnesses.

OLER P. VROOM.
CHARLES H. ARBUCKLE.

Witnesses:
J. P. BREWER,
L. S. HARRIS.